(12) United States Patent
Sawhney et al.

(10) Patent No.: US 12,469,402 B2
(45) Date of Patent: Nov. 11, 2025

(54) MULTI-MODAL SENSOR BASED PROCESS TRACKING AND GUIDANCE

(71) Applicant: Microsoft Technology Licensing, LLC, Redmond, WA (US)

(72) Inventors: Harpreet Singh Sawhney, Kirkland, WA (US); Bugra Tekin, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 1099 days.

(21) Appl. No.: 17/377,152

(22) Filed: Jul. 15, 2021

(65) Prior Publication Data

US 2023/0019745 A1 Jan. 19, 2023

(51) Int. Cl.
*G09B 5/06* (2006.01)
*G02B 27/00* (2006.01)
*G02B 27/01* (2006.01)
*G06F 3/01* (2006.01)
*G06F 3/16* (2006.01)
*G06N 3/02* (2006.01)
*G06T 19/00* (2011.01)

(52) U.S. Cl.
CPC ........... *G09B 5/06* (2013.01); *G02B 27/0093* (2013.01); *G02B 27/017* (2013.01); *G06F 3/011* (2013.01); *G06F 3/017* (2013.01); *G06F 3/167* (2013.01); *G06N 3/02* (2013.01); *G06T 19/006* (2013.01)

(58) Field of Classification Search
None
See application file for complete search history.

(56) References Cited

U.S. PATENT DOCUMENTS

| 9,911,351 | B2 | 3/2018 | White et al. |
| 2014/0310595 | A1 | 10/2014 | Acharya et al. |
| 2020/0250890 | A1 | 8/2020 | Zhou et al. |
| 2020/0336707 | A1 | 10/2020 | Schmirler et al. |

OTHER PUBLICATIONS

"International Search Report and Written Opinion Issued in PCT Application No. PCT/US22/030613", Mailed Date: Sep. 2, 2022, 14 Pages.

*Primary Examiner* — James B Hull
(74) *Attorney, Agent, or Firm* — Alleman Hall & Tuttle LLP

(57) ABSTRACT

Examples are disclosed that relate to computer-based tracking of a process performed by a user. In one example, multi-modal sensor information is received via a plurality of sensors. A world state of a real-world physical environment and a user state in the real-world physical environment are tracked based on the multi-modal sensor information. A process being performed by the user within a working domain is recognized based on the world state and the user state. A current step in the process is detected based on the world state and the user state. Domain-specific instructions directing the user how to perform an expected action are presented via a user interface device. A user action is detected based on the world state and the user state. Based on the user action differing from the expected action, domain-specific guidance to perform the expected action is presented via the user interface device.

18 Claims, 8 Drawing Sheets

MULTI-MODAL SENSOR BASED PROCESS TRACKING AND GUIDANCE

BACKGROUND

Many processes that are performed by a user may comprise a series of steps that involve complex manipulations of real-world objects. For example, a process may comprise individual steps that each involve movement, placement, and/or modification of one or more real-world objects. As such, many opportunities may exist for a user to make errors when performing such a process.

SUMMARY

Examples are disclosed that relate to computer-based detection, understanding and tracking of a process performed by a user, and providing guidance to the user to complete the process. In one example, multi-modal sensor information is received via a plurality of sensors. A world state of a real-world physical environment and a user state in the real-world physical environment are tracked based on the multi-modal sensor information. A process being performed by the user within a working domain is recognized based on the world state and the user state. A current step in the process is detected based on the world state and the user state. Domain-specific instructions directing the user how to perform an expected action are presented via a user interface device. A user action is detected based on the world state and the user state. Based on the user action differing from the expected action, domain-specific guidance to perform the expected action is presented via the user interface device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
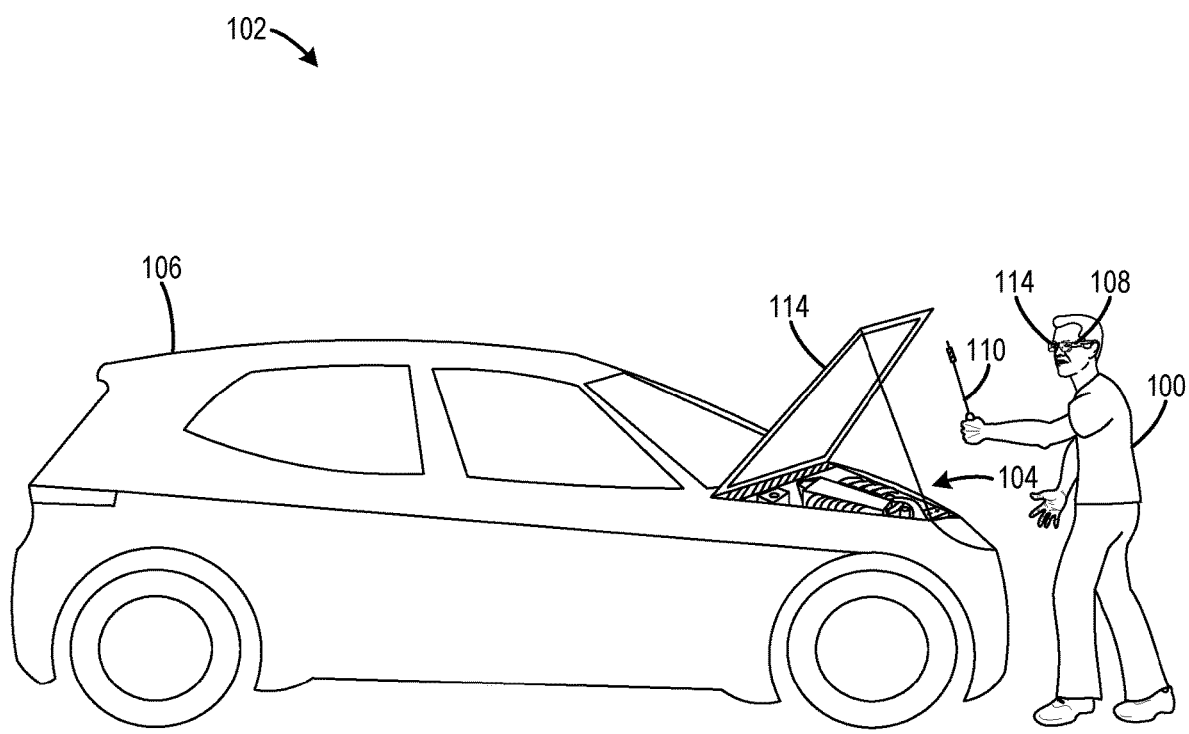
FIG. 1 shows an example scenario in which a user performs a process that is tracked by a computing system configured to employ multi-modal intelligence to provide guidance to the user to complete the process.

Various forms of instructions may be provided to help a user perform a complex process. For example, instructions may take the form of static diagrams and/or text, or a video demonstrating the process. However, such instructions may in some cases be difficult to understand and follow, or otherwise be confusing to the user. Further, it may be difficult for a user to determine if they are performing the process correctly. Also, the user typically will switch between turning the pages or stopping-starting the video, thus at best slowing down in the task and at worst losing track and performing incorrect actions.

Accordingly, examples are disclosed that relate to computer-based tracking of a process performed by a user, and to providing guidance via a computing device to help the user complete the process. In one example, multi-modal sensor information is received via a plurality of sensors. Such multi-modal sensor information may include visual information (e.g., environment/object localization and mapping, head position, hand position, eye gaze) and non-visual information (e.g., audio, speech, motion). A world state of a real-world physical environment and a user state in the real-world physical environment are tracked based on the multi-modal sensor information. A working domain defines the overall task and/or intent that a user is engaged in. An example of a working domain is "checking the oil in my car". A working domain can be specified by the user via speech, text and/or menu selections in an application. The working domain sets up the context within which the described system provides guidance and assesses progress for a task. A process being performed by the user within a working domain is recognized based on the world state and the user state. A current step in the process is detected based on the world state and the user state. Domain-specific instructions directing the user on how to perform an expected action are presented via a user interface device. A user action is detected based on the world state and the user state. Based on the user action differing from the expected action, domain-specific guidance to perform the expected action is presented via the user interface device.

By computer-tracking the world state and the user state using multi-modal sensor information while the user is performing a process, an awareness of the user in relation to the real-world physical environment can be observed and contextualized via multi-modal intelligence. Such physically grounded awareness may allow for the multiple physical and human signals to be integrated and assimilated into real-time states that expose the intent of the user. Further, guidance may be provided in view of such contextualized user intent in order to aid the user in completing the process. Moreover, such high-level, contextually-aware, multi-modal processing allows for providing closed-loop and interactive guidance based on monitoring the user's actions, and providing user- and object-relevant feedback. Such physically aware and contextualized guidance and closed loop feedback may be more helpful to a user than basic instructions that provide no feedback capabilities at all, let alone feedback that is contextualized based on the user state and the world state.

FIG. 1 shows an example scenario of a user 100 in a real-world physical environment 102 performing a process of checking an oil level in an engine 104 of a car 106. The user 100 is wearing a head-mounted display device 108 that is configured to receive multi-modal sensor information via a plurality of sensors of the head-mounted display device 108. The head-mounted display device 108 is configured to track a world state of the real-world physical environment 102 based on the multi-modal sensor information. In the depicted example, the world state may comprise a plurality of objects recognized in the environment 102 including the car 106, the engine 104, an oil dipstick 110, and other parts of the car 106. The world state may track the position of each of these objects as well as other attributes. The head-mounted display device 108 is configured to track a user state in the real-world physical environment that is synchronized to the world state based on the multi-modal sensor information. For example, the user state may include a head position, hand position(s), eye gaze, user motion, and user speech. The user state may be synchronized with the world state such that positions of tracked objects in the environment 102 and a position of the user 100 are defined in terms of a common coordinate system and frame of reference that is associated with the user 100.

The head-mounted display device 108 is configured to recognize a process being performed by the user 100 within a working domain (checking the oil in this example) based on the world state and the user state. In the depicted example, the head-mounted display device 108 recognizes that the user is interacting with the car 106, and more particularly, the dipstick 110 and recognizes that the user 100 is attempting to check the oil level in the car 106. The head-mounted display device 108 may be configured to recognize the particular make/model of the car and correspondingly the type of engine in order to select the appropriate "check oil level" working domain for the engine 104. In some examples, the head-mounted display device 108 may be configured to ask the user to input the particular make/model of the car or other relevant information to identify the appropriate working domain via a suitable user input mechanism (e.g., voice, gestures tracked via computer vision, and/or other modality).

The working domain may be configured specifically for the particular engine and/or make/model of car. The working domain may be one of a plurality different working domains configured for different cars, and more generally, one of a plurality of different working domains configured for different processes that may be performed on different objects. The head-mounted display device 108 may be configured to select the appropriate working domain based on the recognized process and/or object with which the user is interacting.

The working domain may include a three-dimensional (3D) model of the engine (or other object) and associated metadata that provides labels, locations, and descriptions of various parts of the engine 104. In some implementations, the working domain may include a digital twin model that is aligned with the actual real-world engine 104 from the perspective of the user 100. A digital twin model is a virtual representation that serves as a digital counterpart of a physical object or process. The working domain for "checking the oil level" of the engine 104 is used by the head-mounted display device 108 to determine a step in the process, to determine a user intent, and to provide domain-specific instructions and feedback to guide the user 100 to perform a series of steps of the check oil level process. Alignment of the digital twin model to a real-world object enables locating all the labeled parts and entities in the model on the physical object with respect to a user's point of view. This further enables determining user's state in terms of location of hands on the object parts with respect to the working domain.

The head-mounted display device 108 presents domain-specific instructions directing the user how to perform an expected action for a particular step of the check oil level process. For example, the head-mounted display device 108 may visually present instructions, via a near-eye display 112 of the head-mounted display device 108, to instruct the user to open a hood 114 of the car 106. In some examples, such instructions may include virtually rendered cues and movement affordances aligned to the relevant parts of the hood 114. In some examples, such instructions may include audio instructions presented alone or in combination with the virtually rendered cues. When the user opens the hood 114, the head-mounted display device 108 detects an expected action and moves to a next step in the process. In particular, the head-mounted display device 108 aligns the digital twin model of the engine 104 and all associated parts (e.g., the dipstick 110) with the user perspective. Note that the digital twin model may not actually be visually presented to the user via the near-eye display 112.

The head-mounted display device 108 continues to track the world state and the user state via multi-modal sensor information throughout the check oil level process. At each step in the process, the head-mounted display device 108 provides domain-specific instructions directing the user 100 how to perform an expected user action for the current step. For example, the head-mounted display device 108 may direct the user 100 to locate the dipstick 110 by rendering a virtual arrow pointing to the dipstick via the near-eye display 112.

If the head-mounted display device 108 detects a user action that differs from the expected action based on the user state and the world state, the head-mounted display device 108 presents domain-specific guidance to perform the expected action. For example, if the user 100 unscrews the engine oil cap instead of pulling the dipstick 110, the head-mounted display device 108 may present a notification stating "No, that is the engine oil cap. The dipstick is to the right of the engine oil cap. The dip stick has a hook at the end of the stick." Such a notification may be audibly presented via a speaker of the head-mounted display device 108 and/or visually presented via the near-eye display 112. Further, the head-mounted display device 108 may visually present additional virtual cues that more clearly point out or highlight the location of the dipstick 110 via the near-eye display 112.

Note that since the user state and world state are synchronized, instructions and guidance presented to the user 100 by the head-mounted display device 108 are relative to the frame of reference/coordinate system of the user 100. This enables head-mounted display device 108 to understand and instruct with relative directions such as " . . . the dipstick is to the right of the cap . . . ", " . . . pull the dipstick at 5 o'clock from the engine . . . ", " . . . look to your left . . . " etc.

In some cases, the head-mounted display device 108 may model uncertainty of user intent and conduct a two-way dialog with the user 100 to assess user ambiguity and provide appropriate guidance. For example, if the user 100 is pointing at a region of the engine 104 including the oil cap and the dipstick 110, then the head-mounted display device 108 may ask the user 100 a clarifying question to disambiguate the user's intent—e.g., twist the oil cap or pull the dipstick, and then provide appropriate guidance.

The head-mounted display device 108 may provide domain-specific instructions/feedback guidance to the user 100 for each step in the process until the user 100 has successfully completed the process. For example, the head-mounted display device 108 instructs the user to "Hook the dipstick with your finger and yank it out vertically as shown." The head-mounted display device 108 may present an accompanying virtual animation aligned with the position of the actual dipstick 110 demonstrating the expected user action. The user 100 then grabs the dipstick 100 and the head-mounted display device 108 affirms that it is indeed the correct part. The user 100 pulls the dipstick 110 and the head-mounted display device 108 instructs the user 100 to "wipe the end of the dipstick with a cloth and insert the dipstick fully back into the engine." Upon the user 100 correctly performing the expected user action, the head-mounted display device 108 instructs the user 100 to "Now fully pull out the dipstick again and check the top of the oil level." Upon the user 100 correctly performing the expected user action, the head-mounted display device 108 instructs the user 100 that "the check oil level process is complete." In some examples, the head-mounted display device 108 may check or confirm the actual level of the oil on the dipstick and may selectively provide additional instructions/guidance to add additional oil to the engine if needed.

The above-described scenario is one example of a process performed by a user that may be computer-tracked in order to provide physically aware contextualized guidance to the user to complete the process. Such a computer-based process tracking approach is broadly applicable to any suitable type of process that includes a series of steps that are performed by a user to complete the process.

Figure 2:
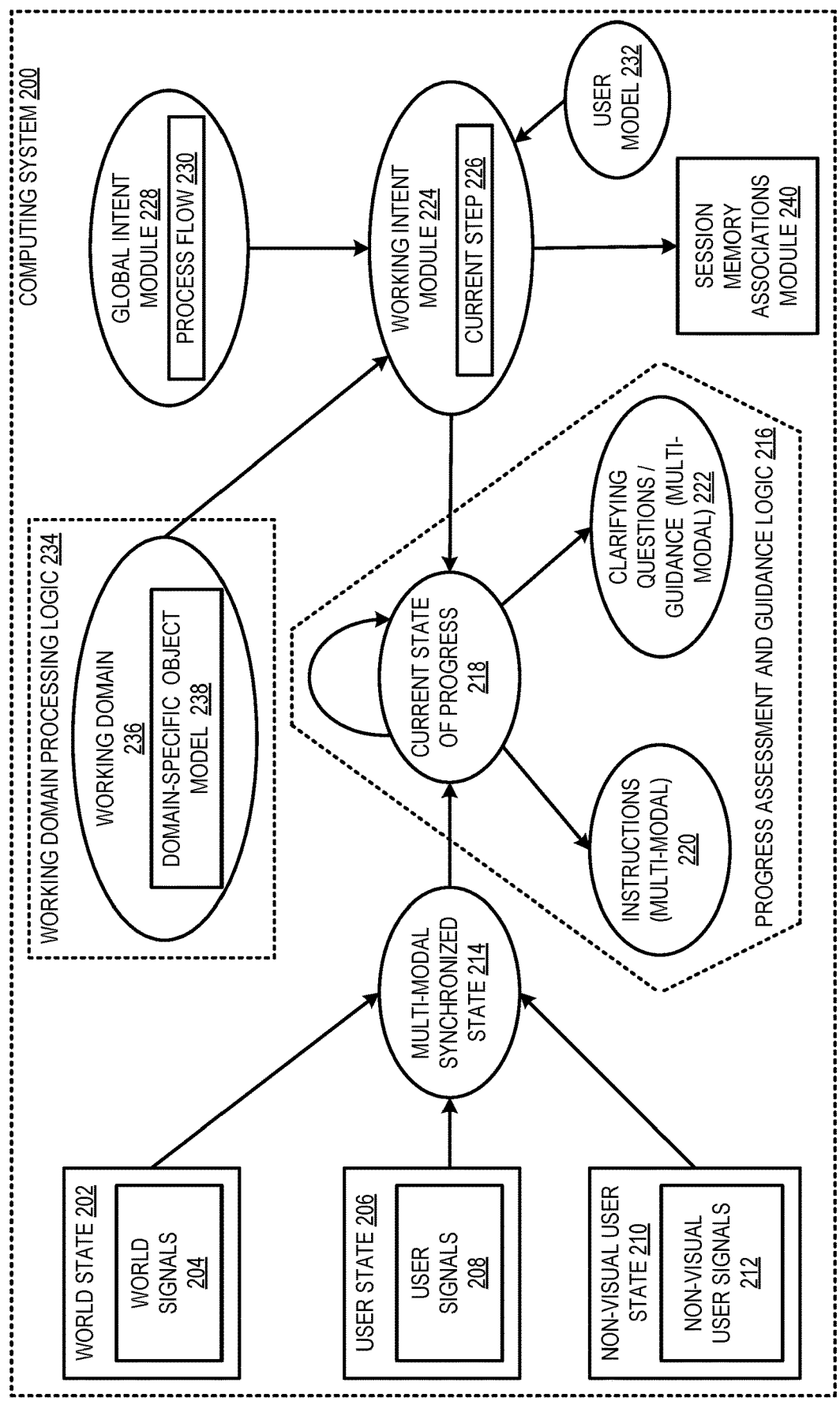
FIG. 2 shows an example computing system comprising a computing architecture configured to track performance of a process by a user and provide guidance for the user to complete the process.

FIG. 2 shows an example computing system 200 having a computing architecture configured to track performance of a process by a user and provide guidance for the user to complete the process. For example, the computing system 200 may be representative of the head-mounted computing device 108, and more generally any suitable computing system configured to performed computer-based performance tracking. Example hardware aspects of computing system 200 are described in more detail below with reference to FIG. 11.

The computing system 200 is configured to receive multi-modal sensor information via a plurality of sensors. Examples of sensors include image sensors (e.g., visible light image sensor, depth sensor, and/or multi-spectral image sensor), audio sensors (e.g., microphones), motion sensors (e.g., inertial measurement unit (IMU)), biometric sensors (e.g., heat rate sensor), environmental sensors (e.g., thermal sensor) and other types of sensors.

The computing system 200 is configured to track a world state 202 of a real-world physical environment based on the multi-modal sensor information in the form of world signals 204. In one example, the world state 202 may be tracked based on analysis of image and/or audio data received from the plurality of sensors. Such analysis may include surface/object localization and mapping to determine the position of objects in the environment and spatial relationships between objects. Further, such analysis may include object recognition to identify different objects in the environment and apply appropriate semantic labels that describe characteristics of the recognized objects.

The computing system 200 is configured to track a user state 206 of the user based on based on the multi-modal sensor information in the form of user signals 208. For example, the user signals 208 may include the user's head pose, the user's hand pose(s), the user's eye gaze, and/or other signals that indicate a state of the user.

The computing system 200 further is configured to track a non-visual user state 210 based on the multi-modal sensor information in the form of non-visual user signals 212. For example, the non-visual user signals 212 may include user speech, text entered by the user, and other non-visual signals that indicate a state of the user.

The computing system 200 also is configured to process the signals of the world state 202, the user state 206, and the non-visual user state 210 to generate a multi-modal synchronized state 214 that integrates and assimilates the multiple physical and human signals into a spatial-semantic state of the world and the user including modeled user intent and uncertainty (where applicable). The multi-modal synchronized state 214 may align the world state 202 and the user state 206 in a common coordinate system that is aligned with a frame of reference of the user, such that instructions and other guidance can be provided relationally to the user. The multi-modal synchronized state 214 may employ any suitable data structure to organize the plurality of high-level inputs that represent the multi-modal synchronized state 214. In one example, the data structure includes a feature vector that characterizes the multi-modal synchronized state 214.

The computing system 200 comprises progress assessment and guidance logic 216 that is configured to recognize a current state of progress 218 in a process being performed by the user within a working domain. The progress assessment and guidance logic 216 is further configured to track the user's progress through completing a series of steps of the process and present domain-specific instructions 220 and clarifying questions/guidance 222 to the user in accordance with the current state of progress 218 of the user throughout the process. In some examples, the domain-specific instructions 220 may be selected from a pre-defined, domain-specific guide that includes domain-specific instructions for each step in the process. Further, in some examples, the clarifying questions/guidance 222 may be closed-loop and interactive guidance based on monitoring the user's actions and modeling user intent/uncertainty. The user intent may be determined based on multi-modal information. For example, the user intent may be determined via the user's pose with respect to an object of interest and the state of the user's gaze, head pose, hands, and speech.

The progress assessment and guidance logic 216 is configured to receive the multi-modal synchronized state 214 that is informed by the world state 202, the user state 206, and the non-visual user state 210 as input. Further, the progress assessment and guidance logic 216 is configured to receive a current step in the process from a working intent module 224.

The working intent module 224 is configured to detect a current step 226 of the process that the user is attempting to complete. The current step 226 may be defined in terms of one or more expected user actions. The working intent module 224 is configured to determine the current step 226 based on information received from a global intent module 228 that is configured to determine an overall process being performed by the user. The global intent module 228 includes a process flow 230 that defines the series of steps of the process.

The working intent module 224 is further configured to detect the current step based on information received form working domain processing logic 234 that is configured to determine/select a working domain 236 that corresponds to the process. The domain of work by a user on which guidance is provided is defined as an object or environment of interest, such as a car engine form the above-described example.

In some examples, the working domain 236 may correspond to a particular object, and the working domain 236 may include a domain-specific object model 238. The domain-specific object model 238 may include a 3D model of the object and metadata that provides labels, locations, and descriptions of various parts of the object. In some examples, the working domain 236 may be created offline by geometric, semantic, and data association type processing using off-the-shelf tools such as 2D/3D object recognition, visual feature computation and keyword extraction for object and part attributes. Such processing also may be performed to create a spatial graph of various parts and their locations to facilitate computation of spatial and prepositional relationships of the object model. In some examples, the domain-specific object model 238 may include a digital twin model that is aligned with a corresponding real-world object from a perspective of the user. The metadata of the digital twin model may be used to provide domain-specific instructions and/or domain-specific guidance to the user while the user is performing the process. In some examples, the digital twin model may be aligned using object anchors or spatial anchors. Object anchors or spatial enable a computing system to detect an object in the physical world using a 3D model and estimate the object's pose (e.g., in 6 degrees of freedom defined as a rotation and translation between the 3D model and its physical counterpart, the real object). The object anchors or spatial anchors allow for the computing system to detect and track instance(s) of that model in the physical environment.

Such alignment enables parts of the object to be located relative to the user's perspective and coordinate system. Moreover, such alignment enables guidance to be provided spatially relative to the user's perspective.

In some examples, the working intent module 224 may be further informed by a user model 232 that is configured to model typical user behavior while performing a process. The user model 232 may be generated based on prior user behavior demonstrated while previously performing various steps in a current process or various prior processes. For example, the user model 232 may indicate what region (e.g., where is the user's focus of attention in the scene?, direction, distance, area of interest), object (e.g., what part of the object has the user's focus of attention), human (e.g., who has the user's focus of attention?, direction, distance, face/person recognition) states has the user demonstrated during prior steps in the current process and/or during prior processes. In some examples, the user model 232 may further indicate prior user preferences/actions/states, such as the user demonstrating being predominantly left-handed or right-handed, how much time did the user take to complete a step and/or a process, or the last time when the user worked on a step or a process.

Further, the user model 232 may indicate typical state sequences or common user actions of the user while performing a process.

The working intent module 224 may be configured to store user actions, the current state of progress, the expected state of the world and the user with respect to the working domain, and other related information in a session memory associations module 240. Returning to the example of checking the oil level, if the user has opened the hood of the car, then the working intent module 224 records that user action and expects that the user will want to locate the dipstick next based on the particular working domain. The session memory associations module 240 may be configured to track user behavior and interaction with object during the steps in the process. Such information may be used to inform the user model 232 and/or other logic to provide context for instructions and/or guidance presented to the user.

Figure 3:
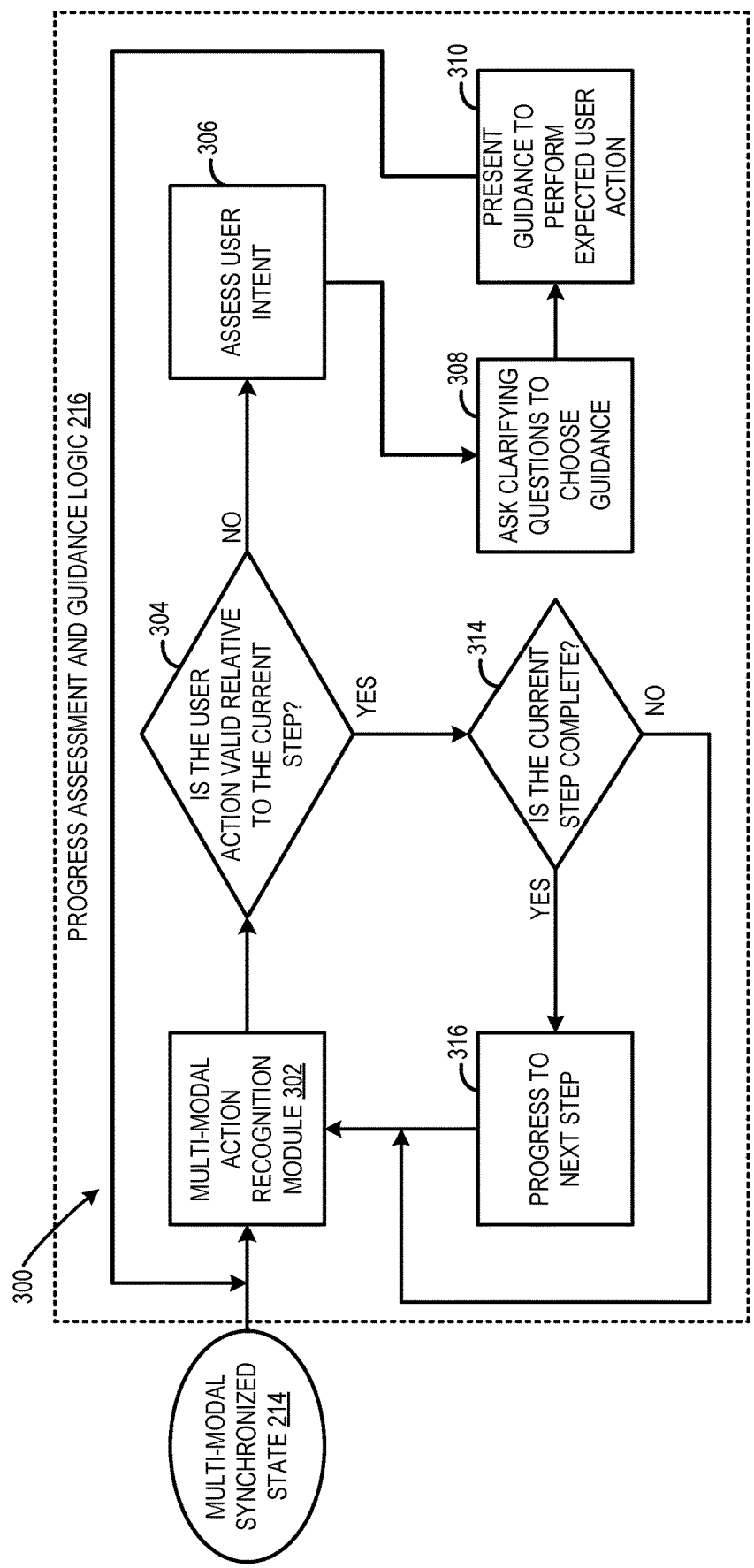
FIG. 3 shows an example process flow illustrating decisions and control performed by progress assessment and guidance logic of the computing system of FIG. 2.

FIG. 3 shows an example process flow 300 illustrating decisions and control that may be performed by progress assessment and guidance logic 216 of the computing system 200 of FIG. 2. A multi-modal action recognition module 302 is configured to detect a user action based on the multi-modal information received form the multi-modal synchronized state 214. In some examples, the multi-modal action recognition module 302 comprises an action-recognition machine-learning model previously trained on multi-modal sensor information corresponding to users performing different domain-specific user actions associated with the series of steps in the process. For example, training data may include labeled video of various users correctly performing steps in a process. In some examples, training data may additionally include labeled video of various users performing incorrect steps in a process in order to train the machine learning model to recognize unexpected user actions. In one example, the action-recognition machine-learning model is implemented using a convolutional neural network (CNN). Such a neural network can comprise any suitable architecture. As one more specific example, such a neural network may comprise variants of a recurrent neural network or temporal convolutional networks for learning a task model from multi-modal data. In other examples, a different type of machine-learning technology may be used to implement the action-recognition machine-learning model.

At 304, the progress assessment and guidance logic 216 is configured to determine if the detected user action is valid relative to the current step, such that the user action matches an expected use action for the current step. If the detected user action is not valid—i.e., the detected user action does not match the expected user action, then the process flow moves to 306. Otherwise, the detected user action is valid and the process flow 300 moves to 314. At 306, the progress assessment and guidance logic 216 is configured to assess user intent based on the multi-modal synchronized state. In some examples, user intent may be represented in terms of user actions being performed by the user as determined based on the user's pose with respect to the object and the state of the user's gaze, head pose, hands, and speech. Further, in some examples, user intent may be represented in terms of the user getting stuck or being confused. In some such cases, user intent may be determined based on user inaction—e.g., the user gaze dwelling at the same location without changes in hand position for more than a threshold period.

At 308, the progress assessment and guidance logic 216 is configured to ask one or more clarifying questions about the user action or current step in the process based on the assessed user intent. At 310, the progress assessment and guidance logic 216 is configured to present domain-specific guidance to the user based on a user response to the clarifying questions. In some examples, the domain-specific guidance may include a virtual cue that highlights a part of the object that is involved in the current step in the process. In some examples, the virtual cue may include movement affordances that inform the user how to manipulate the part of the object. Any suitable guidance may be presented to the user to clear up user confusion and advance the process. After the domain-specific guidance is presented to the user, the progress assessment and guidance logic 216 is configured to return to the multi-modal action recognition module 302 to recognize a next user action. The process flow 300 continues in this manner until a valid/expected user action is recognized. At 314, the progress assessment and guidance logic 216 is configured to determine if a current step is complete. The current step may be complete when all expected user actions have been performed for the current step. If the current step is complete, then the progress assessment and guidance logic 216 is configured to progress to the next step in the process at 316 and the control flow 300 is applied to the next step in the process. Otherwise, if the current step is not complete, then the process flow 300 returns to the multi-modal action recognition module 302 so that the next user action in the current step can be recognized.

The above-described process flow is provided for the purpose of example. In other examples, the progress assessment and guidance logic 216 may be configured in any other suitable manner to track user actions and intent in order to provide suitable guidance for the user to complete a process.

Figure 4:
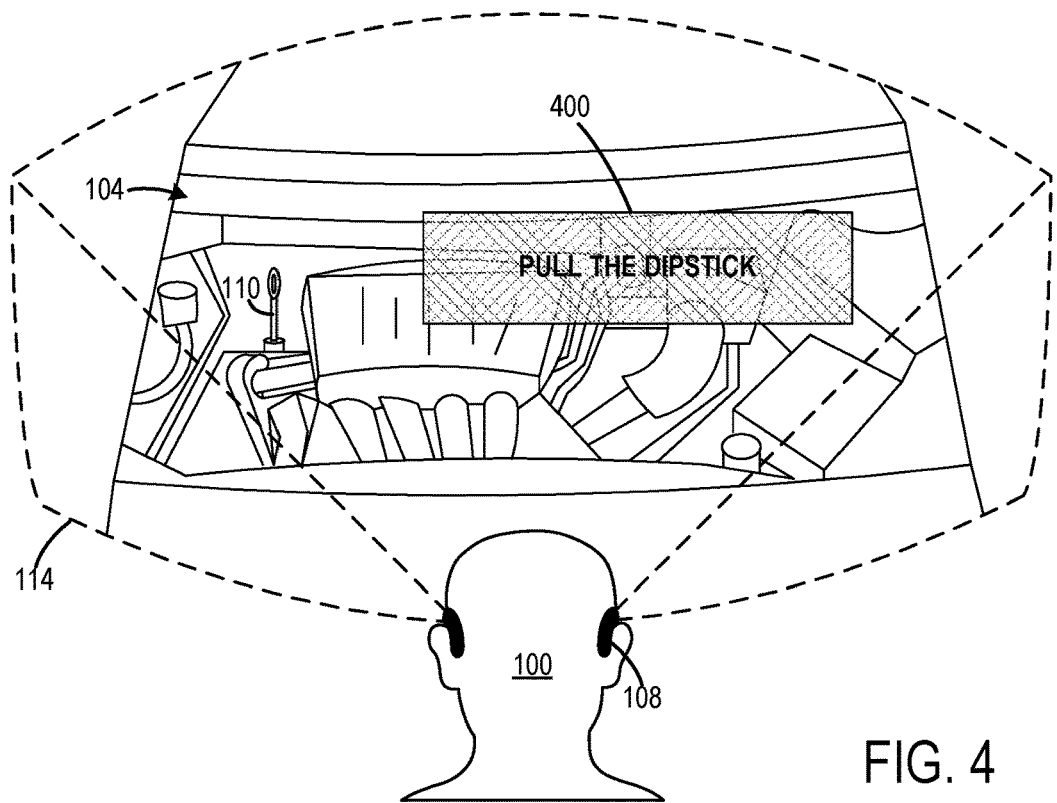
FIGS. 4-7 show an example scenario in which a computing system presents domain-specific instructions and guidance to a user performing a process.

Returning to the example of the user performing the check oil level process, FIGS. 4-7 show an example scenario in which the head-mounted display device 108 presents domain-specific instructions and guidance to the user 100 while performing the check oil level process on the engine 104. In FIG. 4, the head-mounted display device 108 visually presents, via the near-eye display 114, a domain-specific instruction 400 that states "PULL THE DIPSTICK." In this scenario, the head-mounted display device 108 is expecting the user to pull the dipstick 100 out of the engine 104 based on the domain-specific instruction 400 for the current step in the check engine oil process.

Figure 5:
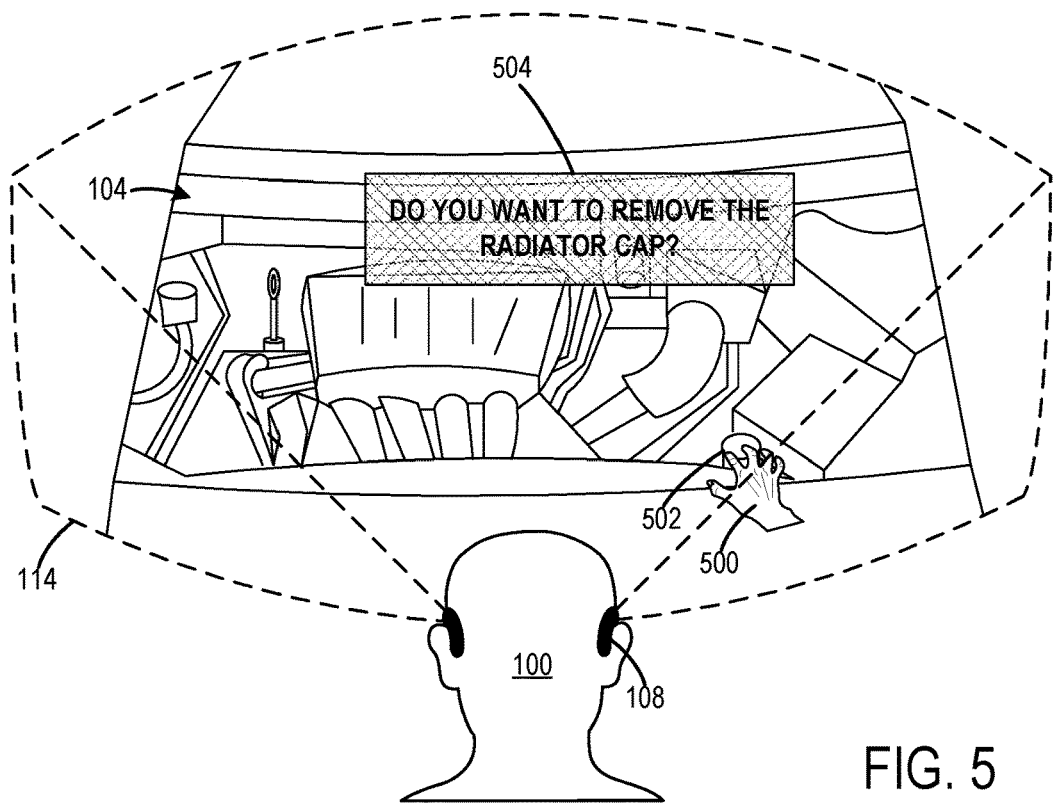

In FIG. 5, the head-mounted display device 108 detects that the user's hand 500 is reaching for the radiator cap 502. This user action does not match the expected user action for the current step in the check engine oil process, because the user's hand is not reaching for the dipstick as instructed. As such, the head-mounted display device 108 visually presents a clarifying question 504, that states "DO YOU WANT TO REMOVE THE RADIATOR CAP?"

Figure 6:
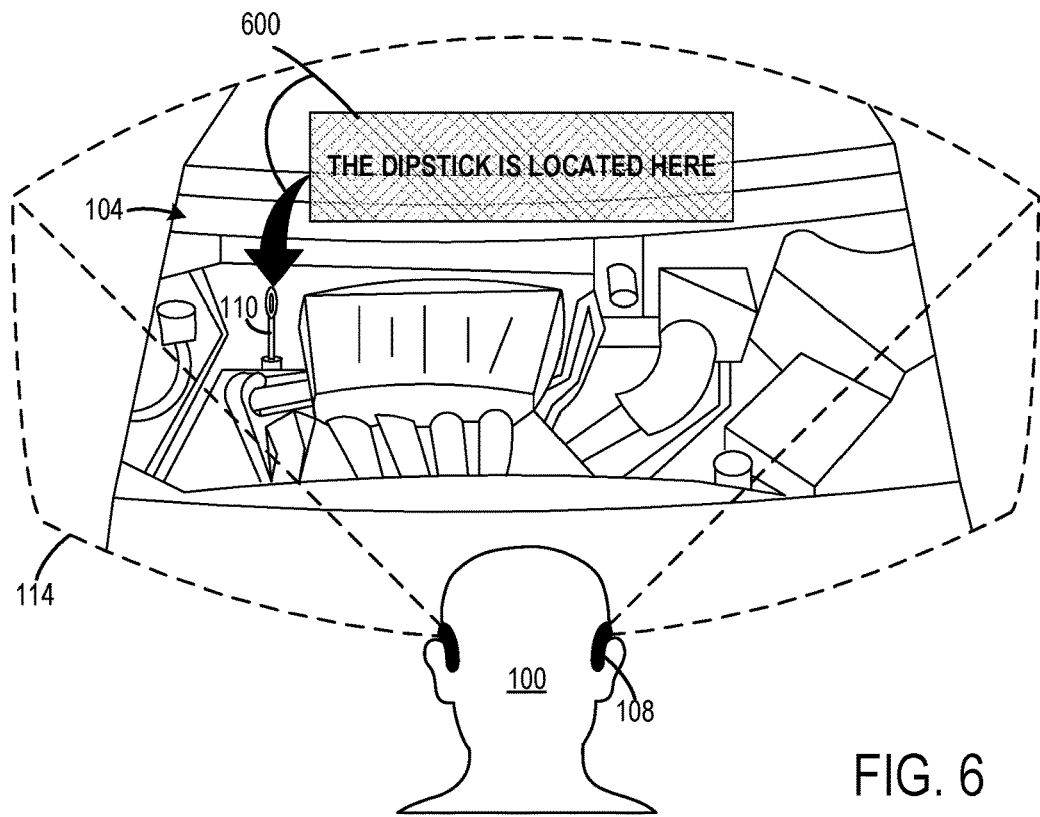

In FIG. 6, the user 100 states "I WANT TO REMOVE THE DIPSTICK." Based on this user response, the head-mounted display device 108 visually presents domain-specific guidance in the form of a virtual label and associated virtual cue 600 that identifies the dipsticks 110 and indicates the location of the dipstick 110 in the engine 104. In some examples, the location of the dipstick 110 may be tracked via the object anchors and/or the digital twin model that is aligned with the real-world engine. Correspondingly, the virtual cue 600 may be positioned based on the object anchors and/or the digital twin model.

Figure 7:
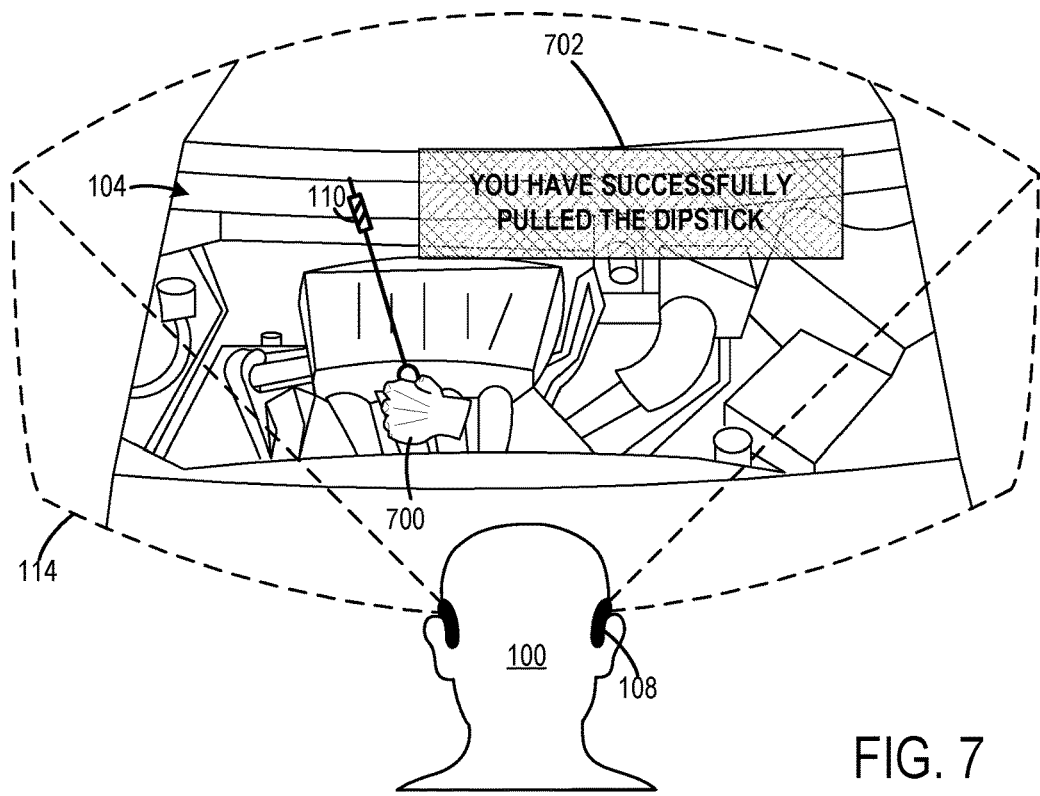

In FIG. 7, the head-mounted display device 108 detects that the user's hand 700 is grasping the dipstick 110, which has been removed from the engine 104. The head-mounted display device 108 recognizes that the user action matches the expected user action for the current step in the process of checking the oil level of the engine. The head-mounted display device 108 visually presents a visual cue 702 providing feedback to the user 100 that the user 100 has successfully completed the current step in the process and the head-mounted display device 108 progresses to the next step in the process. The head-mounted display device 108 presents domain-specific instructions and guidance to the user in the same manner as described above for each step in the process until the user completes the process.

The above-described scenario is provided as a non-limiting example of a manner in which a computing system can provide domain-specific instructions and closed loop feedback/guidance based on multi-modal sensor tracking of a user to complete a process. Such domain-specific instructions and closed loop feedback/guidance may take any suitable form.

Figure 8:
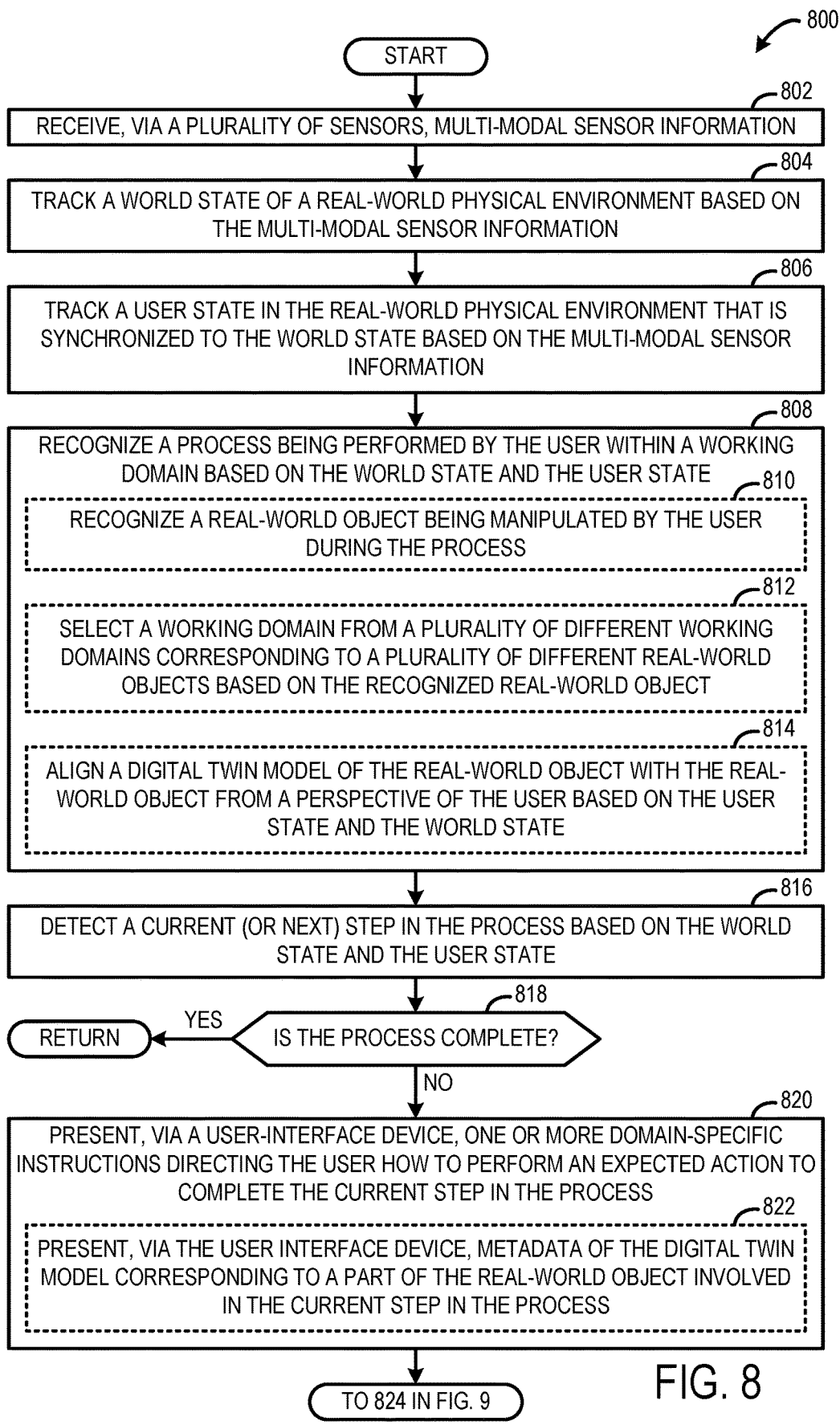
FIGS. 8 and 9 show a flow diagram of an example computer-implemented method for tracking performance of a process by a user and providing guidance for the user to complete the process.
Figure 9:
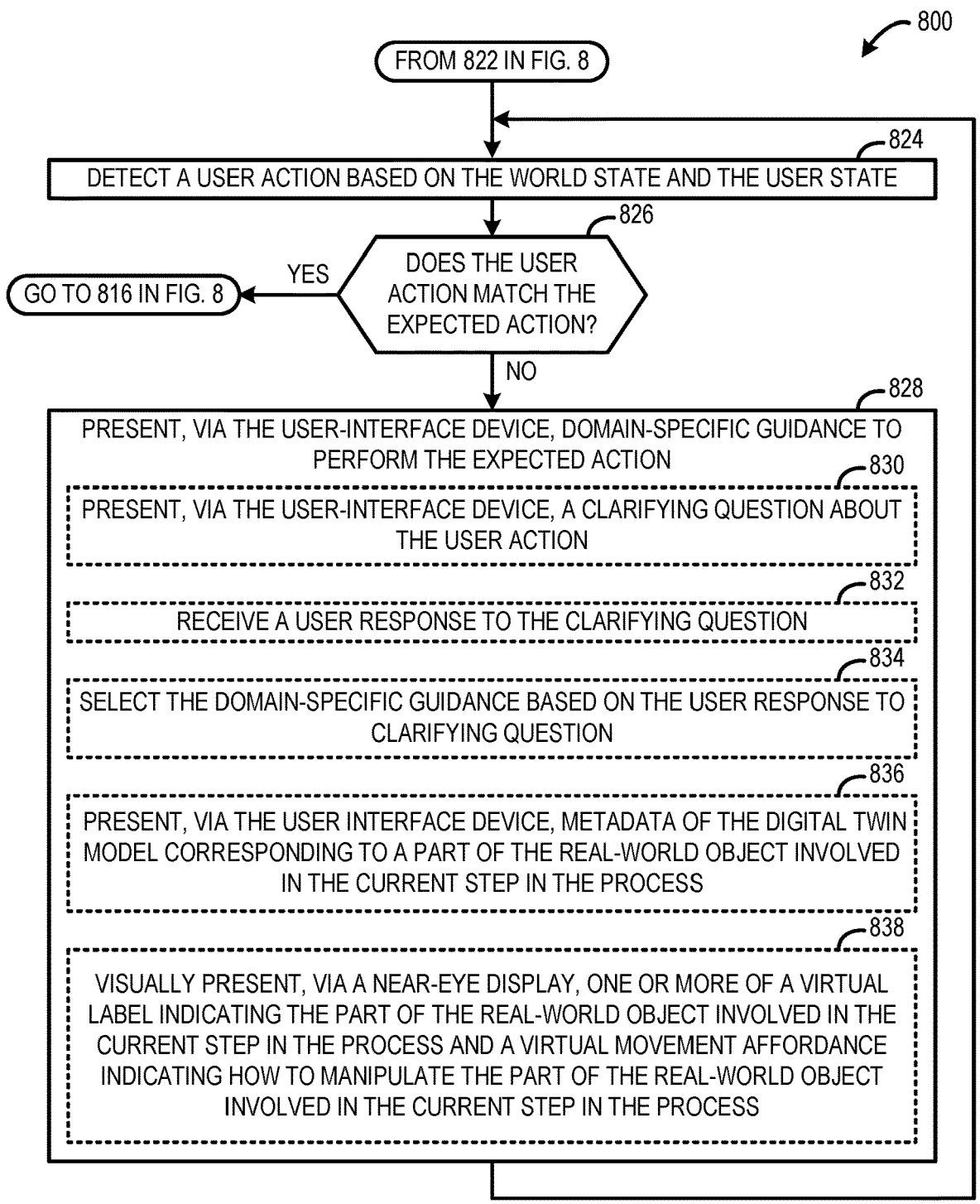

FIGS. 8 and 9 show a flowchart of an example computer-implemented method 800 for tracking performance of a process by a user and providing guidance for the user to complete the process. For example, the method 800 may be implemented by the head-mounted display device 108 shown in FIGS. 1 and 4-7, the computing system 200 shown in FIG. 2, the head-mounted display device 1000 shown in FIG. 10, the computing system 1100 shown in FIG. 11 or generally any suitable computing system capable of handling the processing requirements to implement the method 800.

In FIG. 8, at 802, the method 800 includes receiving, via a plurality of sensors, multi-modal sensor information. For example, the multi-modal sensor information may be received from image sensors (e.g., visible light, depth, multi-spectral), audio sensors, motion sensors, environmental sensors, biometric sensors, and/or any other suitable type of sensor. At 804, the method 800 includes tracking a world state of a real-world physical environment based on the multi-modal sensor information. The world state may track the position of objects in the real-world environment including metadata defining positions, semantic labels, descriptions, as well as other attributes of the objects.

At 806, the method 800 includes tracking a user state in the real-world physical environment that is synchronized to the world state based on the multi-modal sensor information. For example, the user state may include a head position, hand position(s), eye gaze, user motion, and user speech. The user state may be synchronized with the world state such that positions of tracked objects in the environment and a position of the user are defined in terms of a common coordinate system and frame of reference that is associated with the user. At 808, the method 800 includes recognizing a process being performed by the user within a working domain based on the world state and the user state.

In some implementations, at 810, the method 800 optionally may include recognizing a real-world object being manipulated by the user during the process. In some implementations, at 812, the method 800 optionally may include selecting a working domain from a plurality of different working domains corresponding to a plurality of different real-world objects based on the recognized real-world object. In some implementations, at 814, the method 800 optionally may include aligning a digital twin model of the real-world object with the real-world object from a perspective of the user based on the user state and the world state. The digital twin model may comprise metadata defining a plurality of parts of the real-world object, locations of the plurality of parts, and descriptions of the plurality of parts that may be used to provide domain-specific instructions and closed loop feedback/guidance to the user during the process.

At 816, the method 800 includes detecting a current step in the process based on the world state and the user state. At 818, the method 800 includes determining if the process is complete. If the process is complete, then the method 800 returns to other computer operations. Otherwise, the process is not complete, and the method 800 moves to 820. At 820, the method 800 includes presenting, via a user interface device, one or more domain-specific instructions directing the user how to perform an expected action to complete a current step in the process. In some examples, the domain-specific instructions may be visually presented via a display (e.g., mixed reality/augmented reality near-eye see through display). In some examples, the domain-specific instructions may be audible presented via an audio device (e.g., a speaker).

In some implementations where a digital twin model is aligned with the real-world object, at 822, the method 800 optionally may include presenting, via the user interface device, metadata of the digital twin model corresponding to a part of the real-world object involved with the current step in the process as part of the domain-specific instructions. For example, domain-specific instructions may include a description of the part of the object to be manipulated during the current step in the process.

Turning to FIG. 9, at 824, the method 800 includes detecting a user action based on the world state and the user state. At 826, the method 800 includes determining if the user action matches the expected action for the current step in the process. If the user action does not match the expected action, then the method 800 moves to 828. Otherwise, the method 800 returns to 816, where the method 800 detects a next step in the process. The method 800 continues to progress through each step in the process until the process is complete.

Where the user action does not match the expected action at 826, method 800 comprises, at 828, presenting, via a user interface device, domain-specific guidance to perform the expected action for the current step in the process. In some implementations, at 830, the method 800 optionally may include presenting, via the user interface device, a clarifying question about the user action. Further, in some implementations, at 832, the method 800 optionally may include receiving a user response to the clarifying question. Also, in some implementations, at 834, the method 800 optionally may include selecting the domain-specific guidance based on the user response to the clarifying question.

In some implementations where a digital twin model is aligned with the real-world object, at 836, the method 800 optionally may include presenting, via the user interface device, metadata of the digital twin model corresponding to a part of the real-world object involved in the current step in the process.

In some implementations where the user interface device is a near-eye display of a head-mounted display device, at 838, the method 800 optionally may include visually presenting via, the near-eye display one or more of a virtual label indicating the part of the real-world object involved in the current step in the process and a virtual movement affordance indicating how to manipulate the part of the real-world object involved in the current step in the process.

Upon the domain-specific guidance being presented, the method 800 returns to 824 to detect a next user action. If the next use action does not match the expected action, then additional clarifying questions and/or domain specific guidance may be presented to the user until the user performs the expected action to progress to the next step in the process.

The above-described example methods may be performed by a computing system to provide physically-grounded, intelligent tacking of a user via multi-modal signal processing. The methods may be performed by a computing system to aid the user in completing a complex process via step-by-step instruction and closed-loop guidance and question answering. In some implementations, the methods may be implemented by a smart agent or virtual assistant program that is executed by a computing system. In some implementations, the methods may be implemented as an application program. Likewise, in some implementations, the methods may be implemented as a service.

Figure 10:
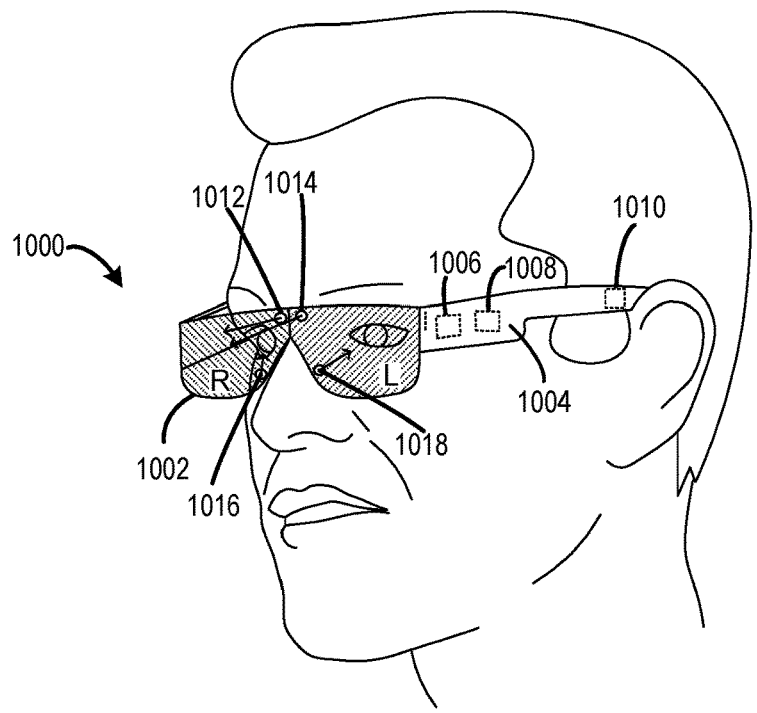
FIG. 10 shows an example head-mounted display device.

As noted above, aspects of the present disclosure may be practiced by a head-mounted display device. The head-mounted display device may take a variety of forms. FIG. 10 shows an example head-mounted display device 1000 including a near-eye display 1002. The head-mounted display device 1000 may take the form of an augmented reality head-mounted display device that comprises an at least partially transparent near-eye display that is configured to enable a wearer of the augmented reality head-mounted display device to view physical, real-world objects in a physical space through one or more partially transparent pixels displaying virtual object representations.

The head-mounted display device 1000 comprises a frame 1004 that wraps around at least a portion of a head of a user to position a display close to the user's eyes. The frame 1004 may support additional components such as, for example, a processor 1006 and associated computer memory 1008. The processor and associated computer memory 1008 may be configured to provide images to the display 1002, to receive sensory signals from input devices, and to enact various control processes and/or other aspects of the methods described herein.

The processor 1006 may include a logic processor and volatile memory and non-volatile storage, as discussed in more detail below with respect to the example computing system 1100 of FIG. 11.

With continued reference to FIG. 10, various suitable display technologies and configurations may be used to display images via the displays of the head-mounted display device 1000. In the example of an augmented reality head-mounted display device, the display 1002 may comprise image-producing elements such as, for example, a liquid crystal on silicon (LCOS) micro display or scanned beam projector, and a see-through waveguide-based or prism-based combiner to deliver virtual images to the user for viewing in combination with the real-world background. Virtual reality displays may utilize similar image-producing elements, but may comprise an opaque enclosure, rather than a transparent combiner.

The display 1002 may include both a left L and right R display in a stereoscopic display configuration. The left L and right R displays each display a view of an augmented reality scene from the perspective of the user's corresponding eye. By viewing the augmented reality scene through the left L and right R displays, the user will perceive virtual objects as being located at particular depths in the real world.

The head-mounted display device 1000 may include various sensors and related systems to provide information to the processor 1006. Such sensors may include an inertial measurement unit (IMU) 1010, one or more outward facing visible light cameras 1012, one or more outward facing depth cameras 1014, and inward facing cameras 1016 and 1018. The position and/or orientation of the head-mounted display device 1000 may be assessed relative to the physical environment. In different examples, signals from the IMU 1010, the one or more outward facing visible light cameras 1012, and/or the one or more depth cameras 1014 may be utilized to provide position and/or orientation data to the processor 1006. The one or more outward facing cameras 1012, 1014 may be configured to capture and/or measure physical attributes of the physical space in which the head-mounted display device 1000 resides. Additionally, such image data and/or depth data may be used to generate a three-dimensional body simulation of the user to track head position, hand position, or position of a different boy part. The inward facing cameras 1016 and 1018 may be configured to track eye gaze of the user using any suitable eye gaze tacking approach.

In some implementations, the head-mounted display device 1000 may include additional sensors that may provide multi-modal sensor information for tracking user actions while the user is performing a process. Such sensors may include audio sensors (e.g., microphones), environmental sensors (e.g., thermal sensors), biometric sensors (e.g., heart rate sensor), and/or any other suitable type of sensor.

In some implementations, the methods and processes described herein may be tied to a computing system including one or more computing devices. In particular, such methods and processes may be implemented as a computer-application program or service, an application-programming interface (API), a library, and/or other computer-program product.

Figure 11:
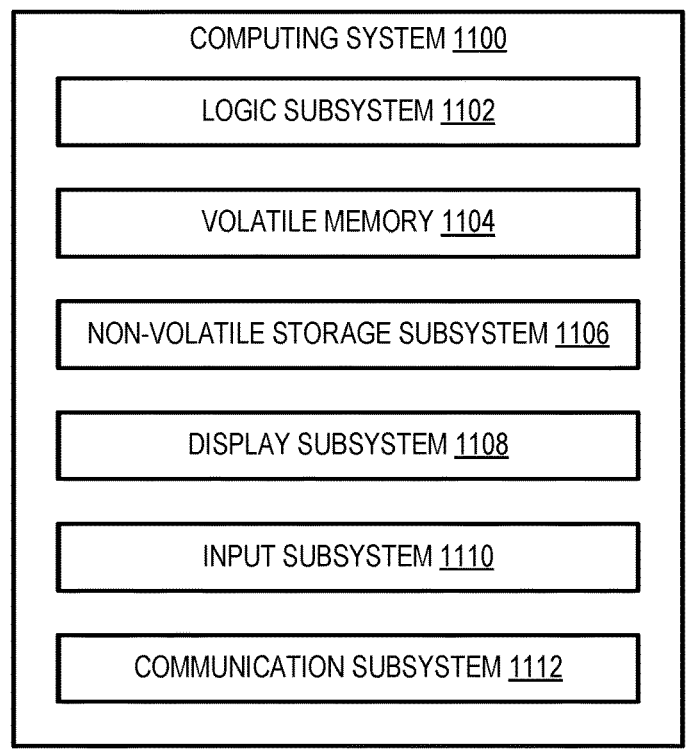
FIG. 11 shows an example computing system.

FIG. 11 schematically shows a non-limiting implementation of a computing system 1100 that can enact one or more of the methods and processes described above. Computing system 1100 is shown in simplified form. For example, the computing system 1100 may embody the head-mounted display device 108 shown in FIGS. 1 and 4-7, the computing system 200 shown in FIG. 2, and the head-mounted display device 1000 shown in FIG. 10. Computing system 1100 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1100 includes a logic subsystem 1102 volatile memory 1104, and a non-volatile storage subsystem 1106. Computing system 1100 may optionally include a display subsystem 1108, input subsystem 1110, communication subsystem 1112, and/or other components not shown in FIG. 11.

Logic subsystem 1102 includes one or more physical devices configured to execute instructions. For example, the logic subsystem may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 1102 may include one or more physical processors (hardware) configured to execute software instructions. Additionally or alternatively, the logic subsystem 1102 may include one or more hardware logic circuits or firmware devices configured to execute hardware-implemented logic or firmware instructions. Processors of the logic subsystem 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic subsystem 1102 may be virtualized and executed by remotely accessible, networked computing devices configured in a cloud-computing configuration. In such a case, these virtualized aspects are run on different physical logic processors of various different machines, it will be understood.

Volatile memory 1104 may include physical devices that include random access memory. Volatile memory 1104 is typically utilized by logic subsystem 1102 to temporarily store information during processing of software instructions. It will be appreciated that volatile memory 1104 typically does not continue to store instructions when power is cut to the volatile memory 1104.

Non-volatile storage subsystem 1106 includes one or more physical devices configured to hold instructions executable by the logic subsystem to implement the methods and processes described herein. When such methods and processes are implemented, the state of non-volatile storage subsystem 1106 may be transformed— e.g., to hold different data.

Non-volatile storage subsystem 1106 may include physical devices that are removable and/or built in. Non-volatile storage subsystem 1106 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage subsystem 1106 may include nonvolatile, dynamic, static, read/write, read-only, sequential-access, location-addressable, file-addressable, and/or content-addressable devices. It will be appreciated that non-volatile storage subsystem 1106 is configured to hold instructions even when power is cut to the non-volatile storage subsystem 1106.

Aspects of logic subsystem 1102, volatile memory 1104, and non-volatile storage subsystem 1106 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "module" may be used to describe an aspect of computing system 1100 typically implemented by a processor to perform a particular function using portions of volatile memory, which function involves transformative processing that specially configures the processor to perform the function. Thus, a module may be instantiated via logic processor 1102 executing instructions held by non-volatile storage device 1106, using portions of volatile memory 1104. It will be understood that different modules may be instantiated from the same application, service, code block, object, library, routine, API, function, pipeline, etc. Likewise, the same module, program, and/or engine may be instantiated by different applications, services, code blocks, objects, routines, APIs, functions, etc. The term "module" may encompass individual or groups of executable files, data files, libraries, drivers, scripts, database records, etc.

Any of the world state and user state tracking, user action recognition, and other process tracking machine-learning analysis described above may be implemented using any suitable combination of state-of-the-art and/or future machine learning (ML), artificial intelligence (AI), and/or other natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems can and may be continually monitored to identify potential bias, errors, and/or unintended outcomes.

When included, display subsystem 1108 may be used to present a visual representation of data held by non-volatile storage device 1106. The visual representation may take the form of a graphical user interface (GUI). As the herein described methods and processes change the data held by the non-volatile storage device, and thus transform the state of the non-volatile storage device, the state of display subsystem 1108 may likewise be transformed to visually represent changes in the underlying data. Display subsystem 1108 may include one or more display devices utilizing virtually any type of technology. Such display devices may be combined with logic subsystem 1102, volatile memory 1104, and/or non-volatile storage subsystem 1106 in a shared enclosure, or such display devices may be peripheral display devices.

When included, input subsystem 1110 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1112 may be configured to communicatively couple various computing devices described herein with each other, and with other devices. Communication subsystem 1112 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1100 to send and/or receive messages to and/or from other devices via a network such as the Internet.

In another example, a computer-implemented method for tracking performance of a process by a user comprises receiving, via a plurality of sensors, multi-modal sensor information, tracking a world state of a real-world physical environment based on the multi-modal sensor information, tracking a user state in the real-world physical environment that is synchronized to the world state based on the multi-modal sensor information, recognizing a process being performed by the user within a working domain based on the world state and the user state, the process comprising a series of steps, detecting a current step in the process based on the world state and the user state, presenting, via a user interface device, one or more domain-specific instructions directing the user how to perform an expected action to complete the current step in the process, detecting a user action based on the world state and the user state, and based on the user action differing from the expected action for the current step in the process, presenting, via the user interface device, domain-specific guidance to perform the expected action. In this example and/or other examples, the computer-implemented method optionally may further comprise based on the user action matching the expected action for the current step in the process, presenting, via the user interface device, one or more additional domain-specific instructions directing the user how to perform a next expected action to complete a next step in the process. In this example and/or other examples, the computer-implemented method optionally may further comprise based on the user action differing from the expected action for the current step in the process, presenting, via the user interface device, a clarifying question about the user action, receiving a user response to the clarifying question. and selecting the domain-specific guidance based on the user response to clarifying question. In this example and/or other examples, the process optionally may include user manipulation of a real-world object, recognizing the process optionally may comprise recognizing the real-world object, and selecting the working domain from a plurality of different working domains corresponding to a plurality of different real-world objects based on the recognized real-world object. In this example and/or other examples, the computer-implemented method optionally may further comprise aligning a digital twin model of the real-world object with the real-world object from a perspective of the user based on the user state and the world state, the digital twin model comprising metadata defining a plurality of parts of the real-world object, locations of the plurality of parts, and descriptions of the plurality of parts, and the one or more domain-specific instructions and the domain-specific guidance optionally may comprise presenting, via the user interface device, metadata of the digital twin model corresponding to a part of the real-world object involved in the current step in the process. In this example and/or other examples, the computer-implemented method optionally may further comprise determining that the user action differs from the expected action for the current step in the process based on the user state indicating that the user is interacting with a different part of the digital twin model than an expected part for the current step in the process. In this example and/or other examples, the user interface device optionally may comprise an augmented-reality device comprising a near-eye display, and the domain-specific guidance optionally may comprise visually presenting, via the near-eye display, one or more of a virtual label indicating the part of the real-world object involved in the current step in the process and a virtual movement affordance indicating how to manipulate the part of the real-world object involved in the current step in the process. In this example and/or other examples, the one or more domain-specific instructions and the domain-specific guidance optionally may be provided within a frame of reference corresponding to a perspective of the user based on the user state and the world state. In this example and/or other examples, tracking the user state optionally may comprise tracking one or more of a user head pose, one or more of the user's hand poses, and user speech. In this example and/or other examples, the user action optionally may be detected via an action-recognition machine-learning model previously trained on multi-modal sensor information corresponding to users performing different domain-specific user actions associated with the series of steps in the process.

In another example, a computing system comprises a processor, and a storage device holding instructions executable by the processor to receive, via a plurality of sensors, multi-modal sensor information, track a world state of a real-world physical environment based on the multi-modal sensor information, track a user state in the real-world physical environment that is synchronized to the world state based on the multi-modal sensor information, recognize a process being performed by the user within a working domain based on the world state and the user state, the process comprising a series of steps, detect a current step in the process based on the world state and the user state, present, via a user interface device, one or more domain-specific instructions directing the user how to perform an expected action to complete the current step in the process, detect a user action based on the world state and the user state, and based on the user action differing from the expected action for the current step in the process, present, via the user interface device, domain-specific guidance to perform the expected action. In this example and/or other examples, the instructions optionally may be executable by the processor to, based on the user action matching the expected action for the current step in the process, present, via the user interface device, one or more additional domain-specific instructions directing the user how to perform a next expected action to complete a next step in the process. In this example and/or other examples, the instructions optionally may be executable by the processor to, based on the user action differing from the expected action for the current step in the process, present, via the user interface device, a clarifying question about the user action, receive a user response to the clarifying question from the user, and select the domain-specific guidance based on the user response to clarifying question. In this example and/or other examples, the process optionally may include user manipulation of a real-world object, recognizing the process optionally may comprise recognizing the real-world object, and selecting the working domain from a plurality of different working domains corresponding to a plurality of different real-world objects based on the recognized real-world object. In this example and/or other examples, the instructions optionally may be executable by the processor to align a digital twin model of the real-world object with the real-world object from a perspective of the user based on the user state and the world state, the digital twin model comprising metadata defining a plurality of parts of the real-world object, locations of the plurality of parts, and descriptions of the plurality of parts, and the one or more domain-specific instructions and the domain-specific guidance optionally may comprise presenting, via the user interface device, metadata of the digital twin model corresponding to a part of the real-world object involved in the current step in the process. In this example and/or other examples, the instructions optionally may be executable by the processor to determine that the user action differs from the expected action for the current step in the process based on the user state indicating that the user is interacting with a different part of the digital twin model than an expected part for the current step in the process. In this example and/or other examples, the user interface device optionally may comprise an augmented-reality device comprising a near-eye display, and the domain-specific guidance optionally may comprise visually presenting, via the near-eye display, one or more of a virtual label indicating the part of the real-world object involved in the current step in the process and a virtual movement affordance indicating how to manipulate the part of the real-world object involved in the current step in the process. In this example and/or other examples, tracking the user state optionally may comprise tracking one or more of the user's head pose, one or more of the user's hand poses, and user speech. In this example and/or other examples, the user action optionally may be detected via an action-recognition machine-learning model previously trained on multi-modal sensor information corresponding to users performing different domain-specific user actions associated with the series of steps in the process.

In yet another example, an augmented-reality device, comprises a plurality of sensors configured to acquire multi-modal sensor information, a near-eye display, and a computing system configured to receive, via the plurality of sensors, multi-modal sensor information, track a world state of a real-world physical environment based on the multi-modal sensor information, track a user state in the real-world physical environment that is synchronized to the world state based on the multi-modal sensor information, recognize a process being performed by the user within a working domain based on the world state and the user state, the process comprising a series of steps, detect a current step in the process based on the world state and the user state, present, via a the near-eye display, one or more domain-specific instructions directing the user how to perform an expected action to complete the current step in the process, detect a user action based on the world state and the user state, and based on the user action differing from the expected action for the current step in the process, present, via the near-eye display, domain-specific guidance to perform the expected action.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for tracking performance of a process by a user, the method performed by a computing device and comprising receiving, via a plurality of sensors, multi-modal sensor information including image data and audio data;

tracking a world state of a real-world physical environment including a plurality of objects based on the multi-modal sensor information by performing object recognition to identify the plurality of objects based at least on the multi-modal sensor information, and by performing object localization and mapping to determine a plurality of positions of the plurality of objects in the environment based at least on the multi-modal sensor information;

tracking a user state in the real-world physical environment at least by tracking a pose of the user based on the multi-modal sensor information;

generating a multi-modal synchronized state that aligns the world state and the user state in a common coordinate system that is aligned with a frame of reference of the user in a data structure that includes a feature vector that characterizes the world state and the user state in the multi-modal synchronized state;

recognizing a process being performed by the user via one or more trained machine learning models that are configured to receive the multi-modal synchronized state including the feature vector as input and determine the process being performed by the user based on the multi-modal synchronized state, the process comprising a series of steps;

selecting a working domain for the process being performed by the user, wherein the working domain includes a digital twin model that is a virtual representation that serves as a digital counterpart of the plurality of objects in the environment;

aligning the digital twin model with the plurality of objects in the environment;

detecting a current step in the process based on the multi-modal synchronized state;

presenting, via a display of the computing device, one or more domain-specific instructions including virtually rendered cues that are aligned relative to the digital twin model of the plurality of objects in the environment, wherein the domain-specific instructions direct the user how to perform an expected action to complete the current step in the process;

detecting a user action based on the multi-modal synchronized state; and based on the user action differing from the expected action for the current step in the process, presenting, via the display of the computing device, a clarifying question to the user, receiving, via an input subsystem of the computing device, a user response to the clarifying question, selecting domain-specific guidance including additional virtually rendered cues that are aligned relative to the digital twin model of the plurality of objects in the environment based on the user response to the clarifying question, and presenting, via the display of the computing device, the domain-specific guidance including the additional virtually rendered cues directing the user to perform the expected action.

2. The method of claim 1, further comprising:
based on the user action matching the expected action for the current step in the process, presenting, via the display, one or more additional domain-specific instructions directing the user how to perform a next expected action to complete a next step in the process.

3. The method of claim 1, wherein the process includes user manipulation of a real-world object, wherein recognizing the process comprises recognizing the real-world object, and selecting the working domain from a plurality of different working domains corresponding to a plurality of different real-world objects based on the recognized real-world object.

4. The method of claim 3,
wherein the digital twin model comprises metadata defining a plurality of parts of the real-world object, locations of the plurality of parts, and descriptions of the plurality of parts, and wherein the one or more domain-specific instructions and the domain-specific guidance comprises presenting, via the display, metadata of the digital twin model corresponding to a part of the real-world object involved in the current step in the process.

5. The method of claim 4, further comprising:
determining that the user action differs from the expected action for the current step in the process based on the multi-modal synchronized state indicating that the user is interacting with a different part of the digital twin model than an expected part for the current step in the process.

6. The method of claim 3, wherein the display comprises near-eye display of an augmented-reality device, and wherein the domain-specific guidance comprises visually presenting, via the near-eye display, one or more of a virtual label indicating the part of the real-world object involved in the current step in the process and a virtual movement affordance indicating how to manipulate the part of the real-world object involved in the current step in the process.

7. The method of claim 1, wherein the one or more domain-specific instructions and the domain-specific guidance are provided within the frame of reference of the user based on the multi-modal synchronized state.

8. The method of claim 1, wherein tracking the user state comprises tracking one or more of a user head pose, one or more of the user's hand poses, and user speech.

9. The method of claim 1, wherein the user action is detected via an action-recognition machine-learning model previously trained on multi-modal sensor information corresponding to users performing different domain-specific user actions associated with the series of steps in the process.

10. A computing system comprising:
a plurality of sensors;
a display;
a processor; and
a storage device holding instructions executable by the processor to:
receive, via the plurality of sensors, multi-modal sensor information including image data and audio data;
track a world state of a real-world physical environment including a plurality of objects based on the multi-modal sensor information by performing object recognition to identify the plurality of objects based at least on the multi-modal sensor information, and by performing object localization and mapping to determine a plurality of positions of the plurality of objects in the environment based at least on the multi-modal sensor information;
track a user state in the real-world physical environment at least by tracking a pose of a user based on the multi-modal sensor information;
generate a multi-modal synchronized state that aligns the world state and the user state in a common coordinate system that is aligned with a frame of reference of the user in a data structure that includes a feature vector that characterizes the world state and the user state in the multi-modal synchronized state;
recognize a process being performed by the user via one or more trained machine learning models that are configured to receive the multi-modal synchronized state including the feature vector as input and determine the process being performed by the user based on the multi-modal synchronized state, the process comprising a series of steps;
select a working domain for the process being performed by the user, wherein the working domain includes a digital twin model, the digital twin model comprising a virtual representation and serving as a digital counterpart of the plurality of objects in the environment;

align the digital twin model with the plurality of objects in the environment;
detect a current step in the process based on the multi-modal synchronized state;
present, via the display, one or more domain-specific instructions including virtually rendered cues that are aligned relative to the digital twin model of the plurality of objects in the environment, wherein the domain-specific instructions direct the user how to perform an expected action to complete the current step in the process;
detect a user action via the one or more trained machine learning models based on the multi-modal synchronized state; and
based on the user action differing from the expected action for the current step in the process, conduct a two-way dialog with the user, select domain-specific guidance including additional virtually rendered cues that are aligned relative to the digital twin model of the plurality of objects in the environment based on the two-way dialog with the user, and present, via the display, the domain-specific guidance including the additional virtually rendered cues directing the user to perform the expected action.

11. The computing system of claim 10, wherein the instructions are executable by the processor to:
based on the user action matching the expected action for the current step in the process, present, via the display, one or more additional domain-specific instructions directing the user how to perform a next expected action to complete a next step in the process.

12. The computing system of claim 10, wherein the process includes user manipulation of a real-world object, wherein recognizing the process comprises recognizing the real-world object, and selecting the working domain from a plurality of different working domains corresponding to a plurality of different real-world objects based on the recognized real-world object.

13. The computing system of claim 12, wherein
the digital twin model comprises metadata defining a plurality of parts of the real-world object, locations of the plurality of parts, and descriptions of the plurality of parts, and wherein the one or more domain-specific instructions and the domain-specific guidance comprises presenting, via the display, metadata of the digital twin model corresponding to a part of the real-world object involved in the current step in the process.

14. The computing system of claim 13, wherein the instructions are executable by the processor to:
determine that the user action differs from the expected action for the current step in the process based on the multi-modal synchronized state indicating that the user is interacting with a different part of the digital twin model than an expected part for the current step in the process.

15. The computing system of claim 12, wherein the display comprises a near-eye display of an augmented-reality device, and wherein the domain-specific guidance comprises visually presenting, via the near-eye display, one or more of a virtual label indicating the part of the real-world object involved in the current step in the process and a virtual movement affordance indicating how to manipulate the part of the real-world object involved in the current step in the process.

16. The computing system of claim 10, wherein tracking the user state comprises tracking one or more of the user's head pose, one or more of the user's hand poses, and user speech.

17. The computing system of claim 10, wherein the user action is detected via an action-recognition machine-learning model previously trained on multi-modal sensor information corresponding to users performing different domain-specific user actions associated with the series of steps in the process.

18. An augmented-reality device, comprising:
a plurality of sensors configured to acquire multi-modal sensor information including image data and audio data;
an input subsystem;
a near-eye display; and
a computing system configured to:
receive, via the plurality of sensors, the multi-modal sensor information;
track a world state of a real-world physical environment including a plurality of objects based on the multi-modal sensor information by performing object recognition to identify the plurality of objects based at least on the multi-modal sensor information, and by performing object localization and mapping to determine a plurality of positions of the plurality of objects in the environment based at least on the multi-modal sensor information;
track a user state in the real-world physical environment at least by tracking a pose of a user based on the multi-modal sensor information;
generate a multi-modal synchronized state that aligns the world state and the user state in a common coordinate system that is aligned with a frame of reference of the user in a data structure that includes a feature vector that characterizes the world state and the user state in the multi-modal synchronized state;
recognize a process being performed by the user via one or more trained machine learning models that are configured to receive the multi-modal synchronized state including the feature vector as input and determine the process being performed by the user based on the multi-modal synchronized state, the process comprising a series of steps;
select a working domain for the process being performed by the user, wherein the working domain includes a digital twin model that is a virtual representation that serves as a digital counterpart of the plurality of objects in the environment;
detect a current step in the process based on the multi-modal synchronized state;
present, via the near-eye display, one or more domain-specific instructions including virtually rendered cues that are aligned relative to the digital twin model of the plurality of objects in the environment, wherein the domain-specific instructions direct the user how to perform an expected action to complete the current step in the process;
detect a user action based on the multi-modal synchronized state; and
based on the user action differing from the expected action for the current step in the process, presenting, via the near-eye display, a clarifying question to the user, receiving, via the input subsystem, a user response to the clarifying question, selecting domain-specific guidance including additional virtually rendered cues that are aligned relative to the digital twin model of the plurality of objects in the environment based on the user response to the clarifying question, and presenting, via the near-eye display, the domain-specific guidance including the additional virtually rendered cues directing the user to perform the expected action.

* * * * *